H. H. STYLL.
EYE PROTECTOR.
APPLICATION FILED DEC. 9, 1919.
1,363,689.
Patented Dec. 28, 1920.
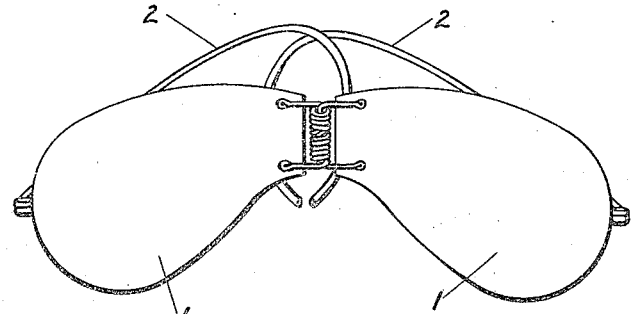
FIG I
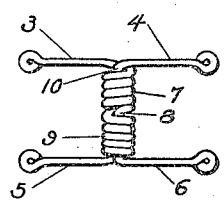
FIG II
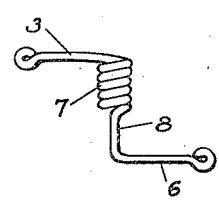
FIG III
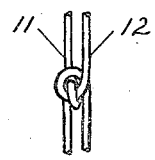
FIG IV
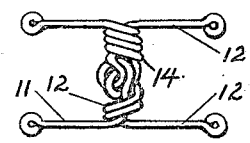
FIG V
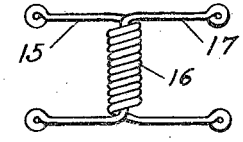
FIG VI
INVENTOR
*H. H. STYLL*
BY
*H. H. Styll & H. H. Parsons*
ATTORNEYS

UNITED STATES PATENT OFFICE.

HARRY H. STYLL, OF SOUTHBRIDGE, MASSACHUSETTS.

EYE-PROTECTOR.

1,363,689.   Specification of Letters Patent.   Patented Dec. 28, 1920.

Application filed December 9, 1919. Serial No. 343,535.

*To all whom it may concern:*

Be it known that I, HARRY H. STYLL, a citizen of the United States, residing at Southbridge, in the county of Worcester and State of Massachusetts, have invented certain new and useful Improvements in Eye-Protectors, of which the following is a specification.

This invention relates to improvements in eye protectors and has particular reference to a structure especially adapted for use in connection with motor glasses, hunting spectacles or other goggles intended for like purposes, although capable of use in heavier form for protection goggles in the industries.

The leading object of the present invention is the provision of novel and improved means for connecting the two lenses which shall be flexible, allow of ready adapting of the mounting to the face of the wearer, and will have an absence of undue rigidity tending to cause breakage of the lenses.

A further object of the invention is the provision of an improved and simplified structure which may be readily manufactured with minimum of parts and at minimum expense.

Other objects and advantages of my invention should be readily apparent by reference to the following specification taken in connection with the accompanying drawings, and it will be understood that I may make any modifications in the specific details of construction shown and described within the scope of the appended claims without departing from or exceeding the spirit of my invention.

Figure I represents a front view of a mounting embodying my improvements.

Fig. II represents an enlarged detail view of the center or lens connection.

Fig. III represents a detailed view of one of the two members forming this center.

Fig. IV represents a view illustrating one step in the formation of a slightly different construction of bridge member.

Fig. V represents a view of this bridge or connection completed.

Fig. VI represents a view of a slightly modified form of the construction.

In the drawings, the numeral 1 designates the lenses having suitable temples or retaining devices 2 for securing the mounting in position on the face of the wearer. In that form of construction illustrated in Figs. I, II and III, I have shown the center or connection for the lenses as comprising the upper pair of arms 3 and 4 and the lower pair 5 and 6 and a central coil portion, this central coil portion having the upper helically wound section 7 forming a continuation of the arm 3 terminating in a straight or uncoiled pivotal portion 8 which terminates in the arm 6. Similarly, the arm 5 has the helical portion 9 encircling the pintle 8 and the pivotal portion 10 extending upward through the coil 7 and terminating in the arm 4. It will thus be seen that in this form of construction there is a helical coil or spring portion interposed between the two oppositely extending arms tending to hold these arms in proper relation to each other but allowing of relative flexing of the arms in either direction. In this construction I have provided an extremely simple and desirable center in that it is necessary to simply wind a short coil on a suitable mandrel in the usual manner, leaving a long end on the coil, then threading the long ends in the opposed coils with their ends extending therethrough and bending over the ends, serving to lock the coils together and at the same time provide the terminal portions for attachment to the lenses.

In Figs. IV and V I have shown a form of construction in which the two wires 11 and 12 are centrally united. In this instance the upper portion of the wire 11 is wound around the wire 12 in a suitable helix 14, this upper portion of the wire 12 being left straight while the lower portion of the wire 12 is wound in a helix around a straight portion of the wire 11, the termini of the wire 11 being secured to one lens and the termini of the wire 12 to the other.

Fig. VI illustrates a slight further modification of the invention in which the wire 15 is formed with a helical coil portion 16 and the wire 17 is threaded therethrough with its ends outwardly deflected providing a central pintle about which the coil 16 winds, and the two attaching ends secured to opposite lenses and supplementing the two ends of the coil in holding the lenses together.

I claim:

1. A center for an ophthalmic mounting comprising two strips of material, one of said strips having a helically coiled portion and a pair of projecting ends for attachment to the lenses and the other of said members having a straight portion extending through the coil, and a pair of projecting ends for attachment to the lenses.

2. A center for an ophthalmic mounting comprising a pair of oppositely disposed members each having a helically coiled portion, a pintle portion forming a continuation of the axis of the coil, and a pair of laterally deflected ends, the pintle portions of the two members extending through the opposite helices to form pintles about which said helices may work.

3. A device of the character described including a pair of members centrally united and each having a straight portion extending away from the point of union at one side and a coil extending away therefrom at the opposite side, the straight portion of the one member projecting through the coil of the opposite member, both of said members having their termini bent at right angles to the axis of the coil for attachment to the lenses of a mounting.

In testimony whereof I have affixed my signature in presence of two witnesses.

HARRY H. STYLL.

Witnesses:
 H. K. PARSONS,
 ALICE G. HASKELL.